United States Patent
Igarashi

(10) Patent No.: US 6,866,693 B2
(45) Date of Patent: Mar. 15, 2005

(54) WASHABLE AIR FILTER FOR INTERNAL COMBUSTION ENGINE

(75) Inventor: Tsutomu Igarashi, Hachiouji (JP)

(73) Assignee: Shuetsutechnica Co., Ltd. (JP)

(*) Notice: Subject to any disclaimer, the term of this patent is extended or adjusted under 35 U.S.C. 154(b) by 0 days.

(21) Appl. No.: 10/165,432

(22) Filed: Jun. 6, 2002

(65) Prior Publication Data

US 2003/0226339 A1 Dec. 11, 2003

(51) Int. Cl.⁷ ............................................. B01D 46/24
(52) U.S. Cl. ................... 55/385.3; 55/525; 55/486; 55/487; 55/485; 55/527; 95/273; 95/281; 95/287; 96/231; 96/286
(58) Field of Search ................. 55/385.3, 525, 55/486, 485, 487, 527; 95/273, 287, 281; 96/231, 286, 288

(56) References Cited

U.S. PATENT DOCUMENTS

| | | | | |
|---|---|---|---|---|
| 4,126,560 A | * | 11/1978 | Marcus et al. ................. | 55/487 |
| 4,589,891 A | * | 5/1986 | Iniotakis et al. ............... | 55/525 |
| 4,699,637 A | * | 10/1987 | Iniotakis et al. ............... | 55/525 |
| 5,224,974 A | * | 7/1993 | Johnson ........................ | 55/525 |
| 5,849,054 A | * | 12/1998 | Fujisawa ...................... | 55/525 |
| 5,863,311 A | * | 1/1999 | Nagai et al. ................... | 55/483 |
| 5,908,481 A | * | 6/1999 | Siddiqui ....................... | 55/485 |
| 5,925,156 A | * | 7/1999 | Motoki et al. ................. | 55/487 |
| 6,096,117 A | * | 8/2000 | Lisson et al. .................. | 55/525 |
| 6,162,286 A | * | 12/2000 | Hasama et al. ................ | 96/231 |
| 6,277,166 B2 | * | 8/2001 | Zettel et al. ................... | 55/525 |

FOREIGN PATENT DOCUMENTS

| | | | |
|---|---|---|---|
| JP | 52-144868 | 11/1977 | ........... B01D/27/06 |
| JP | 06-193525 | 7/1994 | ......... F02M/35/024 |
| JP | 08-100622 | 4/1996 | ........... F01M/11/03 |
| JP | 11-262610 | 9/1999 | ........... B01D/39/12 |

* cited by examiner

Primary Examiner—Minh-Chau T. Pham
(74) Attorney, Agent, or Firm—Marger Johnson & McCollom, P.C.

(57) ABSTRACT

A washable air filter for an internal combustion engine which has high durability and can be washed with ease to reuse it is disclosed. The washable air filter includes an outer cylindrical member 10; an inner cylindrical member 11; a first filter element 30 formed from a stainless mesh sheet which is folded in a pleated-form having peaks and valleys arranged alternately and provided between the outer cylindrical member 10 and the inner cylindrical member 11; and a second filter element 33 provided between the outer cylindrical member 10 and the first tilter element 30. Since the washable air filter uses the filter element made from the stainless mesh sheet, it is possible to effectively remove dust particles from air. Further, the washable air filter can be reused because dust particles are removed off the filter element by washing after use.

10 Claims, 7 Drawing Sheets

|  | Weave Pattern | Wire Diameter [μm] | Mesh Count | Opening Size [μm] |
|---|---|---|---|---|
| Mesh A | Twilled Dutch | 25 × 15 | 500 × 3500 | 5 ~ 6 |
| Mesh B | Twilled Dutch | 40 × 28 | 270 × 2000 | 10 ~ 11 |
| Mesh C | Twilled Dutch | 70 × 45 | 165 × 800 | 33 ~ 35 |
| Mesh D | Twilled Dutch | 100 × 63 | 120 × 400 | 50 ~ 55 |
| Mesh E | Plain Dutch | 120 × 76 | 80 × 400 | 40 ~ 50 |
| Mesh F | Plain Dutch | 180 × 140 | 40 × 200 | 70 ~ 75 |
| Mesh G | Plain Dutch | 230 × 180 | 30 × 150 | 95 ~ 100 |
| Conventional Filter | Filter Paper | — | — | 10 ~ 30 |

Fig.3

WASHABLE AIR FILTER FOR INTERNAL COMBUSTION ENGINE

BACKGROUND OF THE INVENTION

1. Field of the Invention

This invention relates to a washable air filter for an internal combustion engine used for removing dust particles from air to be supplied to an internal combustion engine.

2. Description of the Prior Art

Generally, an internal combustion engine such as an engine for an automobile or the like requires enormous amount of air. If the air supplied to the Internal combustion engine contains dust particles, there is a case that cylinders in the internal combustion engine are damaged, so that the dust particles are removed by using an air filter.

Various shapes of air filters are used according to types or displacements of engines. In recent years, a cylindrical air filter 1A shown in FIG. 7 has been mainly used for engines of automobiles, because it is small in size and has high performance.

In the conventional cylindrical air filter 1A shown in FIG. 7, a filter element 40 having a substantially cylindrical configuration is used. The filter element 40 is formed from a cylindrically formed pleated-sheet in that peaks 41 and valleys 42 are arranged alternately. By using such a filter element 40, it becomes possible to provide a high-performance air filter 1A which is small in size and has large surface area.

In the conventional air filter 1A, the filter element 40 is formed from a sheet material such as non-woven cloth, paper, glass fiber or the like. In such sheet materials, fibers are tangled with each other so that fine or very small openings are complicatedly and irregularly formed among the fibers. During filtration, when air taken from the atmosphere passes through the openings, dust particles contained in the air are trapped by the complicatedly tangled fibers. In this way, the dust particles are removed from the air.

As described above, since the filter element removes dust particles from air by trapping them with the complicatedly tangled fibers, the dust particles are gradually deposited within the filter element due to filtration, and as a result, the filter element will be eventually clogged. In particular, since working vehicles such as concrete mixer vehicles and the like are operated in construction sites where a cloud of dust is generated, air filters used for such working vehicles are likely to be clogged.

When the filter element is clogged, it becomes difficult that air passes through the filter element, which causes insufficient air supply to the engine, resulting in incomplete combustion of the engine. Also, this causes poor fuel consumption and environmental problems such as increase in environmental pollutants contained in exhaust gas or the like.

Therefore, the filter element must be replaced before it is clogged.

As described above, in the conventional air filter 1A, non-woven cloth, paper, glass fiber or the like is used as a material for the filter element 40, and such materials have a structure in that fibers thereof are complicatedly tangled with each other. Because of such structure, the dust particles trapped by the filter element remain inside thereof.

Therefore, even if high-pressure air or the like blows on the filter element for cleaning, it is not possible to remove the dust particles trapped by the complicatedly tangled fibers from the filter element 40. Further, if the filter element of the conventional air filter 1A is washed with water, there is a case that the material of the filter element is deteriorated, especially when the filter element is formed from a paper material.

For these reasons, the conventional air filter using such filter element described above can not be reused. Most of the air filters are disposed of by incineration or the like after their use. However, since the filter elements use organochlorine based adhesives or the like as an adhesive, toxic substances such as dioxin and the like are generated when such filter elements are incinerated, thereby causing an environmental problem.

SUMMARY OF THE INVENTION

In view of the problems described above, it is an object of the present invention to provide a washable air filter for an internal combustion engine which has high durability and can be washed with ease to reuse it (that is, recyclably use it).

In order to achieve the object mentioned above, the present invention is directed to a washable air filter for an internal combustion engine, which comprises an outer cylindrical member having a number of openings; an inner cylindrical member having a number of openings, the inner cylindrical member being arranged inside the outer cylindrical member so as to be spaced apart from the outer cylindrical member; and a first filter element provided between the outer cylindrical member and the inner cylindrical member, the first filter element being formed from a cylindrically-configured stainless mesh sheet which is folded in a pleated-form having peaks and valleys arranged alternately, the stainless mesh sheet being formed from a stainless mesh having an average opening size of 10 to 100 $\mu$m, and the mesh being comprised of woven warp and weft wires having a diameter of 20 to 200 $\mu$m.

In the present invention described above, it is preferred that the warp wires and the weft wires are woven so that two or more wires in either of the warp or weft wires extending substantially parallel to each other are in contact with each other.

Further, it is also preferred that the stainless mesh sheet is woven in dutch weave.

Furthermore, it is also preferred that the washable air filter further comprises a second filter element which is provided between the outer cylindrical member and the first filter element.

Moreover, it is also preferred that the average opening size is 40 to 75 $\mu$m.

Moreover, it is also preferred that the stainless mesh sheet has 4,500 to 540,000 openings per 1 square inch.

In the present invention, it is preferred that the second filter element is provided in at least spaces, each of which is formed by the adjacent two peaks and the valley positioned therebetween.

Further, it Is also preferred that the average opening size of the second filter element is larger than that of the first filter element.

In this case, it is preferred that the second filter element is formed from a demister.

Furthermore, it is also preferred that the air filter can be washed with water containing a cleaning agent by using an ultrasonic cleaning apparatus.

This invention is also directed to a washable air filter for an internal combustion engine for removing dust particles from air to be supplied to the internal combustion engine, which characterized by using a filter element which is formed from a stainless mesh sheet for allowing washing of the air filter for recyclable use, the stainless mesh sheet being formed from a stainless mesh having an average opening size of 10 to 100 μm, and the mesh being comprised of woven warp and weft wires having a diameter of 20 to 200 μm.

In the present invention, it is preferred that the warp wires and the weft wires are woven so that two or more wires in either of the warp or weft wires extending substantially parallel to each other are in contact with each other.

Further, it is also preferred that the stainless mesh sheet is woven in dutch weave.

Furthermore, it is also preferred that the average opening size is 40 to 75 μm.

Moreover, it is also preferred that the stainless mesh sheet has 4,500 to 540,000 openings per 1 square inch.

Moreover, it is also preferred that the stainless mesh sheet is folded in a pleated-form having peaks and valleys arranged alternately, and it is formed into a substantially cylindrical shape.

Moreover, it is also preferred that the air filter can be washed with water containing a cleaning agent by using an ultrasonic cleaning apparatus.

BRIEF DESCRIPTION OF THE DRAWING

FIG. 3 is a table which shows specifications of stainless mesh sheets A to G and a filter paper used for the washable air filter for use in experiment.

DETAILED DESCRIPTION OF THE INVENTION

Hereinbelow, a preferred embodiment of a washable air filter for an internal combustion engine according to the present invention will be described in detail with reference to the accompanying drawings.

Figure 1:
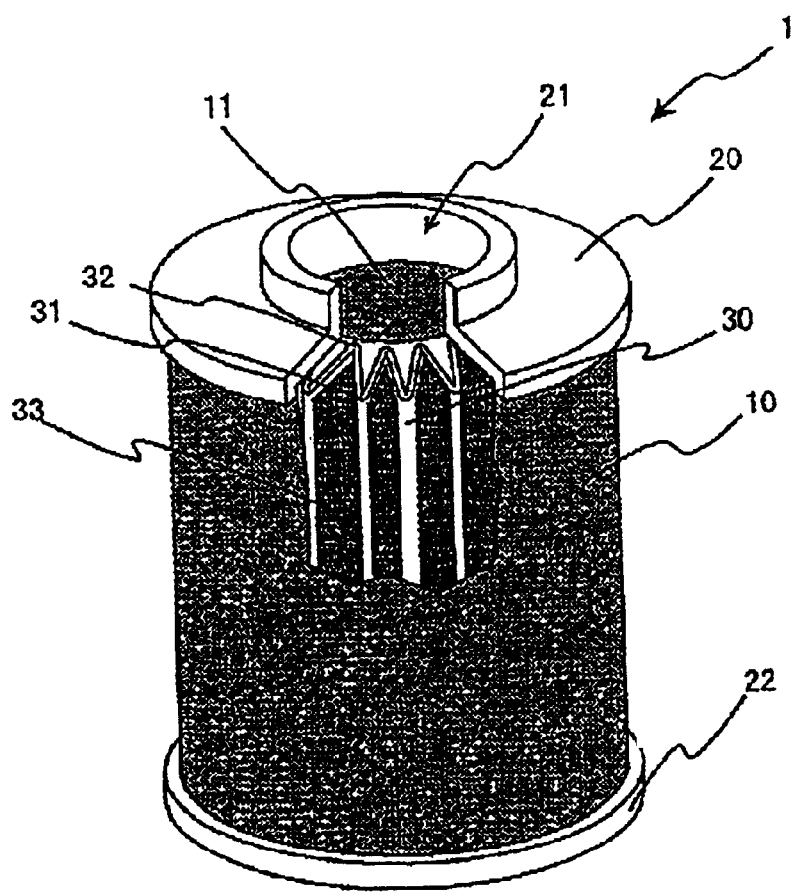
FIG. 1 is a perspective view which shows an overall structure of a washable air filter according to the present invention.
Figure 2:
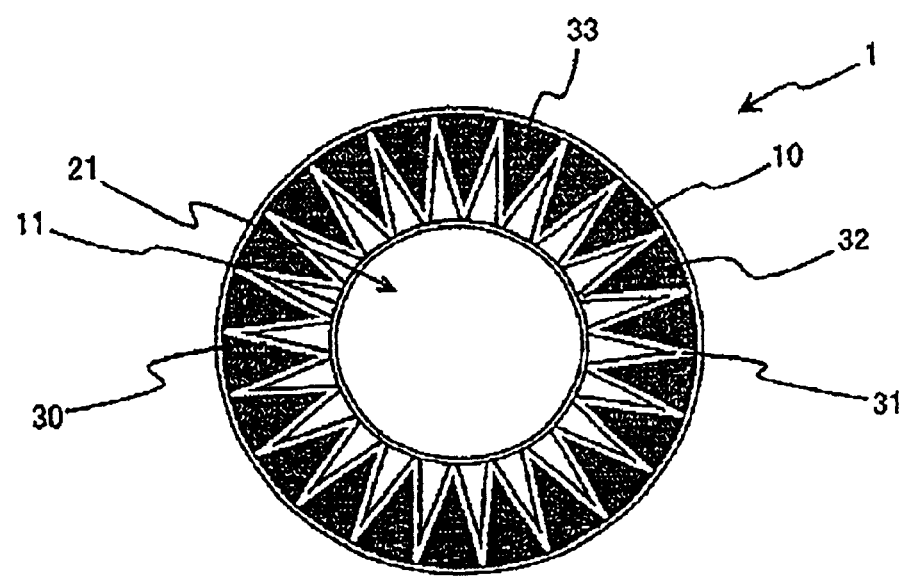
FIG. 2 is a cross sectional view of the washable air filter shown in FIG. 1.

FIG. 1 is a perspective view which shows an overall structure of the washable air filter 1 according to the present invention, and FIG. 2 is a cross sectional view of the washable air filter shown in FIG. 1.

As shown in FIGS. 1 and 2, the washable air filter 1 according to the present invention includes an outer cylindrical member 10, an inner cylindrical member 11, a top cover 20, a bottom cover 22, a first filter element 30, and a second filter element 33. The outer and inner cylindrical members 10 and 11 are formed from a metal wire net, and they are formed into a cylindrical shape, respectively. The top and bottom covers 20 and 22 cover a circular top end face and a circular bottom end face of the outer cylindrical member 10 and the inner cylindrical member 11, respectively. The first filter element 30 is provided between the outer cylindrical member 10 and the inner cylindrical member 11, and the second filter element 33 is provided between the first filter element 30 and the outer cylindrical member 10.

As described above, the outer cylindrical member 10 and the inner cylindrical member 11 are formed from the metal wire net, and they are respectively formed into a cylindrical shape so as to have different diameters. Such outer cylindrical member 10 and inner cylindrical member 11 are substantially concentrically arranged so as to have a space therebetween as shown in FIG. 2. Alternatively, the outer cylindrical member 10 and the inner cylindrical member 11 may be formed from metal sheet materials such as perforated or punched metal sheet or the like instead of the metal wire net used in the present embodiment. However, it is preferred that the cylindrical members 10 and 11 are formed from a metal wire net for providing better flow of water in washing process as is the case of the embodiment described above.

As shown in FIG. 1, the top cover 20 and the bottom cover 22 cover the top end face and the bottom end face of the outer cylindrical member 10 and the inner cylindrical member 11, respectively. The top cover 20 is provided in its roughly central portion with an air outlet opening 21, from which air that has passed through the second filter element 33 and the first filter element 30 is drawn into the internal combustion engine. On the other hand, the bottom cover 22 is not provided with an opening such as the air outlet opening 21 provided In the top cover 20 so that the bottom end face of the outer cylindrical member 10 is completely closed with the bottom cover 22.

For the first filter element 30, a stainless mesh sheet which is folded in a pleated-form having peaks 31 and valleys 32 arranged alternately at substantially regular intervals is used. As shown in FIGS. 1 and 2, the first filter element 30 is formed into a cylindrical shape by rounding such pleated stainless mesh sheet. The first filter element 30 is provided between the outer cylindrical member 10 and the inner cylindrical member 11 so that the ridgelines of the peaks 31 are arranged along the inner surface of the outer cylindrical member 10, and the ridgelines of the valleys 32 are also arranged along the outer surface of the inner cylindrical member 11.

In this regard, it is to be noted that specifications such as wire diameter and average opening size of the stainless mesh sheet used for the first filter element 30 will be described in detail later.

The second filter element 33 is provided between the outer cylindrical member 10 and the first filter element 30. Specifically, the second filter element 33 is comprised of a plurality of elongated elements, and each elongated element is provided in a space which is formed by the adjacent two peaks 31 and the valley 32 positioned between the two peaks 31 as shown in FIGS. 1 and 2.

Further, each elongated element 33 is formed by rolling a metal mesh or demister made of aluminum, stainless steel or the like into a shape and size that can be fitted in the space formed by the peaks 31 and the valley 32.

Furthermore, by setting the wire diameter and the average opening size of the metal mesh used for the second filter element 33 larger than those of the stainless mesh sheet used for the first filter element 30, it becomes possible to remove dust particles having relatively large diameter from air before the air passes through the first filter element 30. This allows effective filtration to be achieved, and a process of washing the air filter is also simplified.

Moreover, it is preferred that the second filter element 33 is formed from a metal mesh or demister made of stainless steel, aluminum, titanium or the like having high resistance to oxidation and corrosion in terms of ease of washing or maintenance.

However, it is to be noted that in the present invention, the second filter element may be omitted from the air filter. Without the second filter element, it is possible to obtain sufficient performance. This makes it possible to simplify the manufacturing process of the air filter, resulting in reduction in the manufacturing cost of the air filter.

Hereinbelow, a detailed description will be made with regard to functions of the washable air filter of the present embodiment. In the present embodiment, the air outlet opening 21 provided in the top cover 20 of the washable air filter 1 is to be connected with a suction pipe of an engine for an automobile or the like as is the case of the conventional air filter. Therefore, air is taken into the inside of the inner cylindrical member 11 from the outside of the outer cylindrical member 10 when the engine or the like draws air.

The air taken from the outside of the outer cylindrical member 10 passes the outer cylindrical member 10, the second filter element 33, the first filter element 30, and the inner cylindrical member 11 in this order through openings thereof, and the air which have passed all the cylindrical members and the filter elements is drawn into the internal combustion engine such as an engine for an automobile or the like through the air outlet opening 21. At this time, the first filter element 30 and the second filter element 33 adsorb dust particles contained in the air, so that the dust particles are removed from the air.

In the washable air filter 1 of the present embodiment, the filter elements will be clogged due to the dust particles adsorbed by the filter elements as is the same with the case of the conventional air filter 1A. However, the filter element of the present invention can be reused by washing it after every predetermined distance of driving. When washing the air filter 1 of the present invention, it is preferred that water preferably containing a cleaning agent is sprayed to the air filter 1 in the direction from the inner cylindrical member 11 toward the outer cylindrical member 10. By doing so, the dust particles, which are adsorbed by the filter elements while passing through the air filter in the direction from the outer cylindrical member 10 toward the inner cylindrical member 11 together with air during use of the air filter 1, are moved in the direction from the inner cylindrical member 11 toward the outer cylindrical member 10 (that is, in the reverse direction in the case of filtration) together with the water containing a cleaning agent and then removed off the air filter.

Alternatively, the air filter may be washed using an ultrasonic cleaning apparatus. In this case, water containing a cleaning agent is preferably used for a cleaning fluid. Commercially available ultrasonic cleaning apparatuses and cleaning agents can be used for this purpose. With the ultrasonic cleaning, it is possible to wash the air filter in a few minutes by only setting it in a bath filled with water containing a cleaning agent.

Hereinbelow, a detailed description will be made with regard to an actual embodiment of the first filter element 30, that is the specifications of the first filter element 30 such as wire diameter and average opening size and the like.

1. Method for Manufacturing First Filter Element 30

The first filter element 30 is formed from a stainless mesh sheet which is formed from a stainless mesh woven in dutch weave such as plain dutch weave or twilled dutch weave.

In this regard, it is to be noted that plain dutch weave is woven in a plain weave pattern (that is a weave pattern in which warp wires and weft wires are arranged at regular intervals and each warp (weft) wire alternately crosses over and under each weft (warp) wire), but either warp or weft wires extending substantially parallel to each other are in contact with each other. Twilled dutch weave is woven in a twilled weave pattern (that is a weave pattern in which warp wires and weft wires are arranged at regular intervals and each warp (weft) wire crosses over and under two or more weft (warp) wires), but either warp or weft wires extending substantially parallel to each other are in contact with each other.

By weaving the stainless wires in dutch weave, it is possible to easily manufacture a stainless mesh having openings with smaller average size as compared with a case that the wires are woven in plain weave or in twilled weave. In addition to this, since such dutch-woven stainless mesh has adequate strength, it is suitable for use in the washable air filter for an internal combustion engine as the first filter element 30 which is required to have high stiffness and small average opening size.

2. Performance Evaluation

For the washable air filter of this invention, performance evaluation was made as follows.

(1) Measurement of differential pressure in the air filters using different filter elements A new (unused) air filter was prepared and mounted to a diesel engine EK-100 (which is manufactured by Hino Motors, Ltd. and has 13,260 cc of displacement and 270 horsepower), and then the revolutions per minute of the diesel engine was increased in the state where the engine is put under no load to measure the differential pressure between the outside of the air filter and the air outlet opening at every predetermined revolutions per minute of the engine. The performance evaluation was made based on performance curves obtained from measurement values of the differential pressure in the respective air filters.

Figure 7:
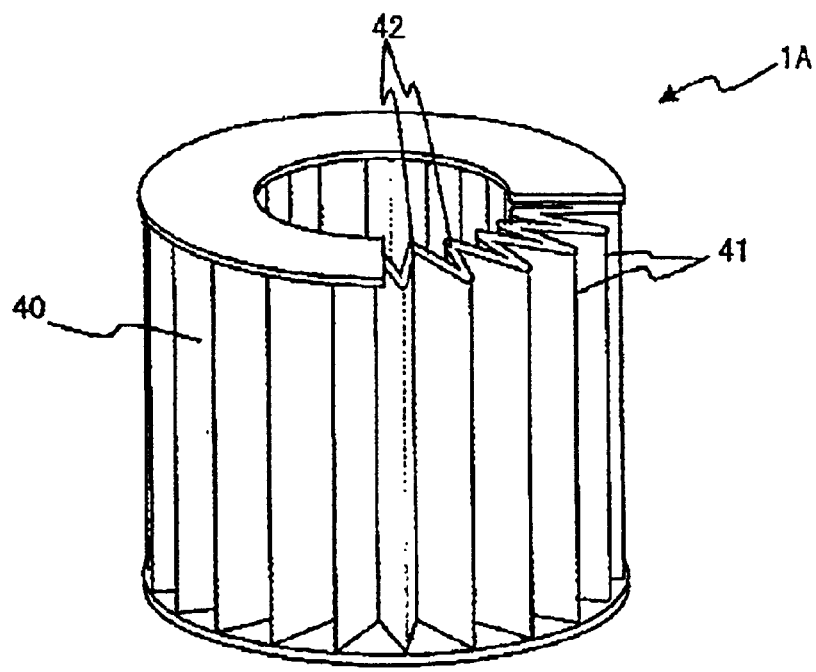
FIG. 7 is a perspective view which shows an overall structure of a conventional air filter.

In more details, this performance evaluation was made by comparing each of the performance curves obtained from measurement values for the respective air filters using stainless mesh sheets A to G (as the first filter element) with a performance curve obtained from measurement values for the conventional air filter using a filter paper as its filter element (which is the same type as the air filter 1A shown in FIG. 7). Specifications of the stainless mesh sheets A to G (first filter elements) such as weave pattern, wire diameter, mesh count (the number of openings per 1 square inch), and average opening size are shown in FIG. 3.

Figure 4:
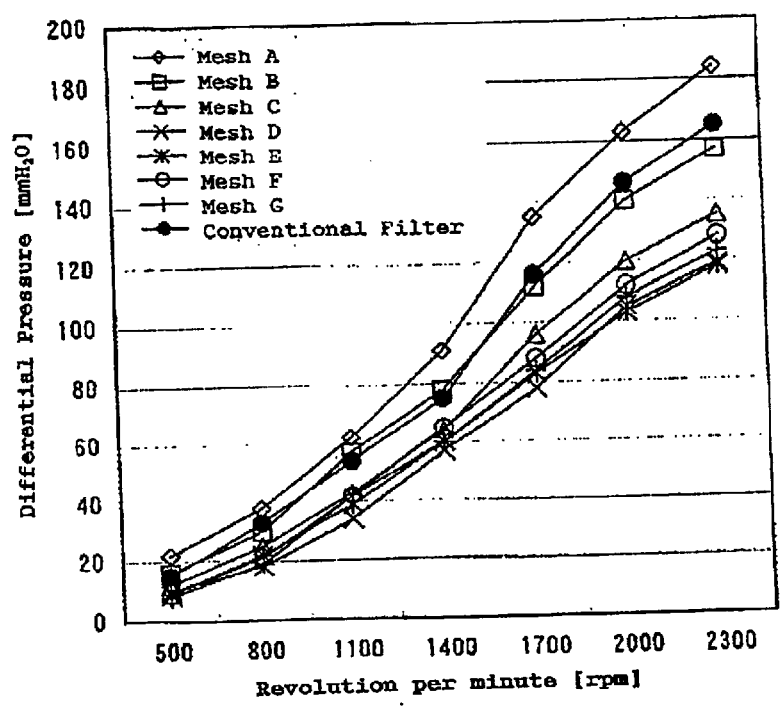
FIG. 4 is a graph which shows changes in differential pressure with respect to the increase in the revolutions per minute of an engine in the air filters in which the filter elements formed from the stainless mesh sheets A to G and the filter element formed from the filter paper are used, respectively.

The measurement results are shown in FIG. 4. In the graph shown in FIG. 4, the vertical axis indicates the differential pressure and the horizontal axis indicates the revolutions per minute, and the performance curves for the respective air filters are shown by plotting the measurement values thereof.

From the measurement results, it was confirmed that the air filters using the stainless mesh sheets B to G (that is, except for the stainless mesh sheet A) as the first filter element show lower differential pressure than the conventional air filter, that is each of these air filters has improved performance.

On the other hand, as apparent from the measurement result for the air filter using the stainless mesh sheet A, it was confirmed that the air filter using the stainless mesh sheet having openings with an average size of less than 10 µm shows higher differential pressure than the conventional air filter.

Consequently, it was confirmed that it is possible to achieve a washable air filter having higher performance than the conventional air filter by setting the average opening size of the stainless mesh sheet to 10 to 100 µm (that is, by setting the average opening size within the range from that of the stainless mesh sheet B to that of the stainless mesh sheet G) and more preferably setting it to 40 to 75 µm (that is, by setting it within the range from that of the stainless mesh sheet D to that of the stainless mesh sheet F), and by setting the wire diameter of the wire constituting the stainless mesh sheet to 20 to 200 µm. The stainless mesh sheets having the above parameters roughly correspond to stainless mesh sheets having the mesh count (that is the number of the openings per 1 square inch) of 4,500 to 540,000 (that is, the mesh count within the range from that of the stainless mesh sheet B to that of the stainless mesh sheet G).

On the other hand, as described above, an air filter using the stainless mesh sheet having openings with an average size of less than 10 µm is inferior to the conventional air filter in performance. This means that such an air filter is liable to be clogged.

Further, if the stainless mesh sheet having openings with an average size of larger than 100 µm is used, cylinders in the internal combustion engine is liable to be damaged due to dust particles which have passed through the openings of the stainless mesh sheet. For this reason, such a stainless mesh sheet is not suitable for a filter element for an air filter for an internal combustion engine.

(2) Recovery of Filtering Performance by Washing

Similar to the experiment (1), a new (unused) air filter was mounted to the diesel engine EK-100 used in the above measurement (which is manufactured by Hino Motors, Ltd. and has 13,260 cc of displacement and 270 horsepower), and then the revolutions per minute of the diesel engine was increased in the state where the engine is put under no load to measure the differential pressure between the outside of the air filter and the air outlet opening at every predetermined revolutions per minute of the engine. In this experiment, the measurement was also made for the air filter using the used filter element and the air filter using the filter element which had been washed after use. The performance evaluation was made based on performance curves obtained from measurement values of the differential pressure in the respective air filters.

Figure 5:
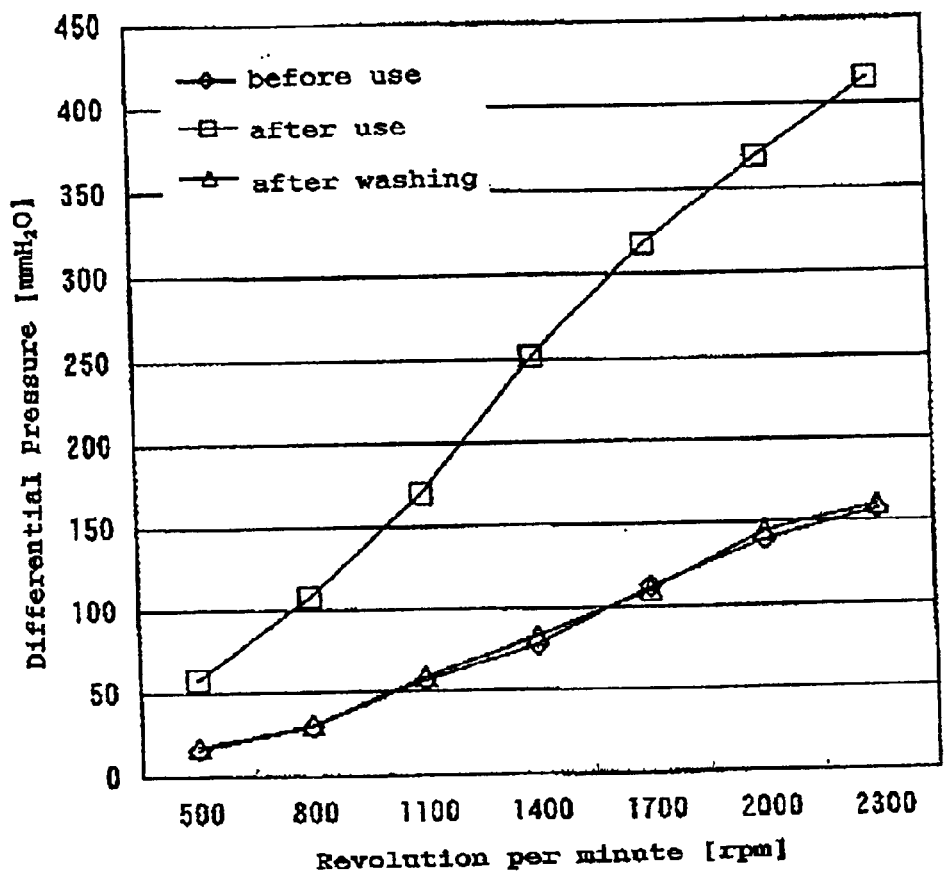
FIG. 5 is a graph which shows changes in differential pressure with respect to the increase in the revolutions per minute of the engine in the air filter using the filter element formed from the stainless mesh sheet B, wherein the measurements are made before the use of the filter, after the use of the filter and after washing the used filter, respectively.
Figure 6:
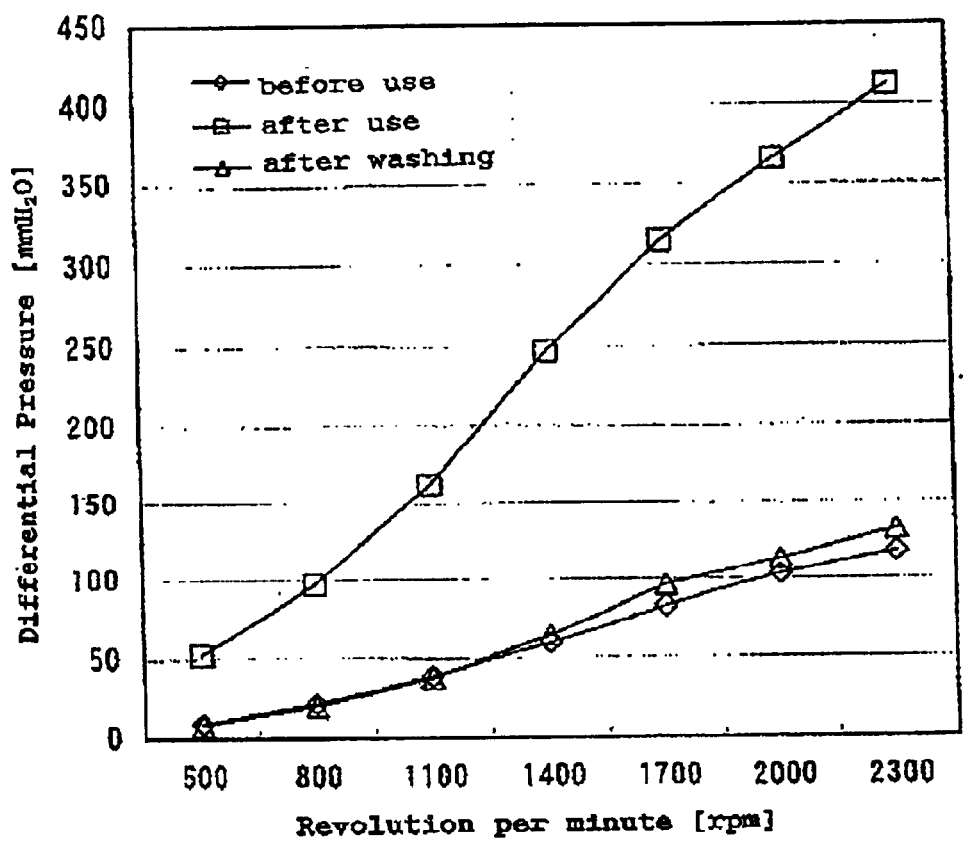
FIG. 6 is a graph which shows changes in differential pressure with respect to the increase in the revolutions per minute of the engine in the air filter using the filter element formed from the stainless steel E, wherein the measurements are made before the use of the filter, after the use of the filter and after washing the used filter, respectively.

In this regard, it is to be noted that the performance evaluation was made for the air filters using the stainless mesh sheets B and E shown in the table of FIG. 3. The measurement result for the air filter using the stainless mesh sheet B is shown in FIG. 5, and the measurement result for the air filter using the stainless mesh sheet E is shown in FIG. 6. In each graph, the vertical axis indicates the differential pressure and the horizontal axis indicates the revolutions per minute, and three performance curves for the air filter are shown by plotting the measurement values thereof.

From these measurement results, it was confirmed that the air filter according to the present invention can be returned to its original condition (that is the condition prior to use) by washing after use. Further, since such performance recovery by washing was recognized in both the stainless mesh sheets B and E, it was confirmed that it is possible to return the performance of the air filter to its almost original condition by washing after use regardless of the differences in their average opening size, the wire diameter, and the mesh count.

In this regard, it is to be noted that the unit [mmH$_2$O] of differential pressure used in this measurement can be converted by the following formula to the unit [Pa] (an SI unit).

$$1[\text{mmH}_2\text{O}] \approx 0.0098[\text{Pa}]$$

As described above, in the present invention, if the average opening size of the stainless mesh sheet exceeds the above upper limit value, there is a case that cylinders or pistons in the internal combustion engine are damaged. This results from the following reasons. It is known that dust particles contained in air with a particle size of less than 100 µm are almost carbon, and it has been confirmed that even if such dust particles are supplied to the internal combustion engine, they are burned out with fuel in the cylinders thereof. On the other hand, dust particles contained in air with a particle size of larger than 100 µm are almost soil, sand or the like. If such dust particles are supplied to the internal combustion engine, soil, sand or the like may cause the damage of cylinders or pistons. For these reasons, by setting the average opening size of the stainless mesh sheet used for the air filter for an internal combustion engine less than 100 µm, it is possible to prevent dust particles which cause the damage of the cylinders from entering the internal combustion engine.

Further, if the average opening size of the stainless mesh sheet is less than the above lower limit value, clogging is likely to occur so that filtering performance is lowered as compared with the conventional filter element formed from paper material or non-woven cloth. Further, if the average opening size of the stainless mesh sheet is less than 10 µm, dust particles are likely to be caught in the openings between the wires so that it becomes difficult to remove them off the filter element by washing. For this reason, by setting the average opening size of the stainless mesh sheet larger than 10 µm, it is possible to provide a washable air filter which can be reused by washing.

Furthermore, by setting the wire diameter of the wire constituting the stainless mesh sheet about 20 µm or more as described in the above, it is possible to provide a washable air filter which can stand the negative high-pressure from the internal combustion engine without the use of any reinforcing elements.

Moreover, if the wire diameter of the wire exceeds 200 µm, it becomes difficult to fold the stainless mesh sheet into a pleated-form.

As described above, in the present invention, the first filter element 30 is formed from a stainless mesh sheet. However, this invention is not limited thereto, and the first filter element 30 may be formed from a metal wire sheet made of aluminum, titanium, or the like which has high resistance to oxidation or corrosion.

Further, in the present invention, the first filter element 30 is formed from one stainless mesh sheet. However, this invention is not limited thereto, and the first filter element 30 may be formed by laminating a plurality of stainless mesh sheets along the direction of thickness. In this case, by laminating an outer sheet having a larger average opening size onto an inner sheet having a smaller average opening size, it becomes possible to easily remove dust particles off the air filter by washing, for example.

Although the washable air filter 1 according to the present invention has been described in detail with reference to the embodiment, the air filter according to the present invention dose not always require the outer cylindrical member 10 and the inner cylindrical member 11. That is, the outer cylindrical member 10 and the inner cylindrical member 11 may be eliminated as is the case of the conventional air filter 1A. In such a case, the top cover 20 and the bottom cover 22 described in the above are directly mounted to the top end face and the bottom end face of the first filter element 30 which is formed into a cylindrical shape.

Further, the air filter is not always required to be formed into a roughly cylindrical shape as described above. The air filter may be formed into a substantially-truncated cone shape in which the top end face and the bottom end face of the air filter have different diameter from each other; polygon tubular shape in which the top end face and the bottom end face of the air filter are formed into quadrangle or triangle; or flat shape in which a plurality of stainless mesh sheets are overlapped with each other.

Finally, the present invention is not limited to the embodiment in the above, and many changes or additions may be made without departing from the scope of the invention which is determined by the following claims.

As described above, since the washable air filter of the present invention uses the filter element made from the stainless mesh sheet as described above, it is possible to effectively remove dust particles from air. Further, the washable air filter of the present invention can be reused because dust particles are removed off the filter element by washing after use.

What is claimed is:

1. A washable air filter for an internal combustion engine of a vehicle for recyclable use, comprising:

an outer cylindrical member formed of a metal material and having a number of openings;

an inner cylindrical member formed of a metal material and having a number of openings, the inner cylindrical member being arranged inside the outer cylindrical member so as to be spaced apart from the outer cylindrical member; and a first filter element provided between the outer cylindrical member and the inner cylindrical member, the first filter element consisting of a cylindrically-configured stainless mesh sheet which is folded in a pleated-form having peaks and valleys arranged alternately and along an axial direction thereof, the stainless mesh sheet being formed from a stainless mesh having an average opening size of 10 to 100 $\mu$m, and the mesh being comprised of woven warp and weft wires having a diameter of 20 to 200 $\mu$m, wherein the combination of the outer cylindrical member formed of a metal material, the inner cylindrical member formed of a metal material and the first filter element consisting of a cylindrically-configured stainless mesh sheet allows washing of the air filter for the recyclable use.

2. The washable air filter for an internal combustion engine as claimed in claim 1, wherein the warp wires and the weft wires are woven so that two or more wires in either of the warp or weft wires extending substantially parallel to each other are in contact with each other.

3. The washable air filter for an internal combustion engine as claimed in claim 1, wherein the stainless mesh sheet is woven in dutch weave.

4. The washable air filter for an internal combustion engine as claimed in claim 1, further comprising a second filter element which is provided between the outer cylindrical member and the first filter element.

5. The washable air filter for an internal combustion engine as claimed in claim 1, wherein the average opening size is 40 to 75 $\mu$m.

6. The washable air filter for an internal combustion engine as claimed in claim 1, wherein the stainless mesh sheet has 4,500 to 540,000 openings per 1 square inch.

7. The washable air filter for an internal combustion engine as claimed in claim 4, wherein the second filter element is provided in at least spaces, each of which is formed by die adjacent two peaks and the valley positioned therebetween.

8. The washable air filter for art internal combustion engine as claimed in claim 4, wherein the average opening size of the second filter element is larger than that of the first filter element.

9. The washable air filter for an internal combustion engine as claimed in claim 8, wherein the second filter element is formed from a demister.

10. The washable air filter for an internal combustion engine as claimed in claim 1, wherein the stainless mesh sheet is formed by laminating a plurality of stainless mesh sheet elements.

* * * * *